United States Patent [19]

Stroud et al.

[11] Patent Number: 5,096,379
[45] Date of Patent: Mar. 17, 1992

[54] FILM COOLED COMPONENTS

[75] Inventors: David Stroud; Arthur G. Corfe, both of Bristol, England; Jonathan P. W. Towill, Cardiff, Wales; Brian G. Cooper, Derby, England

[73] Assignee: Rolls-Royce plc, London, England

[21] Appl. No.: 568,781

[22] Filed: Aug. 17, 1990

Related U.S. Application Data

[63] Continuation of Ser. No. 417,971, Oct. 10, 1989, Pat. No. 4,992,025.

[30] Foreign Application Priority Data

Oct. 12, 1988 [GB] United Kingdom ............... 8823874

[51] Int. Cl.$^5$ ............................................. F01D 5/00
[52] U.S. Cl. ............................. 416/97 R; 415/115; 415/116; 29/889.721
[58] Field of Search ............... 416/96 R, 96 A, 97 R, 416/97 A, 95; 415/115, 116; 219/69.11, 69.12, 69.13, 69.17; 29/889.721, 889.722

[56] References Cited

U.S. PATENT DOCUMENTS

| | | | |
|---|---|---|---|
| 3,698,834 | 10/1972 | Meginnis | 416/96 R |
| 3,700,418 | 10/1972 | Mayeda | 416/97 A |
| 3,801,489 | 4/1974 | Samson | 204/284 |
| 3,968,368 | 6/1976 | Emmerson | 416/96 A |
| 4,601,638 | 7/1986 | Hill | 416/97 R |
| 4,664,597 | 5/1987 | Auxier et al. | 416/97 R |
| 4,672,727 | 6/1987 | Field | 416/97 R |
| 4,705,455 | 11/1987 | Saam et al. | 416/97 R |
| 4,737,613 | 4/1988 | Frye | 219/121.72 |
| 4,762,464 | 8/1988 | Vertz et al. | 416/97 R |
| 4,852,232 | 8/1989 | Wells | 219/69.12 |

OTHER PUBLICATIONS

European Search Report dtd. 4-02-91 (The Hague), Appln. No. EP 89 31 0322.

Primary Examiner—Edward K. Look
Assistant Examiner—Hoang Nguyen
Attorney, Agent, or Firm—Cushman, Darby & Cushman

[57] ABSTRACT

A variety of configurations for convergent-divergent film cooling holes are disclosed, together with the hole drilling methods necessary to achieve the configurations.

9 Claims, 4 Drawing Sheets

FILM COOLED COMPONENTS

This is a continuation of application Ser. No. 07/417,971, filed Oct. 10, 1989, now U.S. Pat. No. 4,992,025.

BACKGROUND OF THE INVENTION

1. Field of the Invention

The present invention relates to the cooling of components subject to the impingement of hot gases, for example in turbomachines, the coolant exiting the components through small holes to film-cool the heated surfaces of the components. In particular, it relates to measures capable of reducing the likelihood of blockage of such holes by environmental debris entrained in the flow of coolant or hot gas.

2. Background Information

Typical examples of such components are air-cooled nozzle guide vanes and high pressure turbine rotor blades, which are situated directly downstream of a gas turbine engine's combustion chambers. The film cooling holes are arranged in spanwise rows along the flanks of the aerofoil portions of the blades or vanes so that the streams of cooling air emerging from the holes onto the external surface can collectively protect it from direct contact with the hot gases and carry heat away by merging together to form a more-or-less continuous film of cooling air flowing next to the surface. The process of merging of the individual streams can be aided by flaring the apertures in the external surface so as to encourage the streams of cooling air to fan out towards each other.

One problem with operation of engines containing such blades and vanes is that the film cooling holes have been subject to blockage by dust entrained in the cooling air systems, particularly in middle eastern countries. Because of the high temperatures at which these components operate, small dust particles which strike the edges of the holes, due to vorticity of the air flow through or over the entrances and exits of the holes, become slightly plastic and stick to the edges; this accretion process can continue over many hours' service until blockage occurs. Blockage can occur either internally of the aerofoil at the film hole inlets, or on the outside of the aerofoil at their outlets, through it is most serious at their inlets because of the difficulty of cleaning the insides of blades and vanes. Blockage can also occur to a lesser extent part-way through the hole.

SUMMARY OF THE INVENTION

The main object of the invention is therefore to provide novel configurations of film cooling holes which ease the situation with regard to blockage by dust accretion.

According to the present invention, there is provided for use in turbomachinery or the like, a film-cooled component subject to heating by hot fluid flowing therepast, the component having wall means with one side thereof being a first surface subject to said heating and the other side thereof being a second surface subject to cooling by flow of pressurised coolant thereover, the wall means having a plurality of film cooling holes therethrough connecting the first and second surfaces to allow coolant to flow through said holes onto the first surface for film-cooling of the same, wherein the holes comprise in coolant flow series an inlet aperture on the second surface, a convergent portion, a coolant flow metering restriction, a divergent portion and an outlet aperture on the first surface, the metering restriction connecting the narrowest parts of the convergent and divergent portions. The metering restriction may comprise an edge at an intersection of the convergent and divergent portions, or it may comprise a short passage.

In the case of air-cooled turbine blades or vanes in gas turbine engines, the above film cooling hole configuration is particularly useful for reducing the previously mentioned blockage of the holes by environmental debris entrained in the cooling air, in that at the least, as compared with a configuration involving a cylindrical hole, or a hole flared or enlarged only at its outlet, the provision of the enlarged entry provides an increased area for egress of cooling air from the interior chamber without substantially increased coolant flow rates out of it, this increased internal hole area therefore taking longer to block up.

Furthermore, the resulting reduced entry velocities of the cooling air into the hole produces decreased vorticity at the edges of the entry, so reducing the tendency of particles to be deposited onto the edges from the airstream. Reduced vorticity also results from hole edges which make an included angle with the internal surface of the wall means of substantially greater than 90° due to the convergence of the entry.

Likelihood of blockage part-way through the hole is also reduced because the length of hole at the minimum (throttling) diameter is shorter.

According to one embodiment of the invention, the convergent and divergent portions are frusto conical in shape, but in an alternative preferred embodiment the convergent and divergent portions are fan-shaped; this configuration, amongst others as will be realized from a perusal of the accompanying description, produces inlet and outlet apertures which are elongate. The elongation may advantageously be transverse of the expected flow of coolant or hot fluid therepast.

In a further alternative embodiment the inlet and outlet apertures, the convergent and divergent portions and the metering restriction comprise the three-dimensional envelope of a group of mutually crossing holes which overlap each other throughout their lengths. This may be produced more cheaply and thus may be preferable to other configurations.

Where possible, the film cooling holes may be obliquely oriented with respect to their penetration of the first surface such that coolant discharged therefrom has a component of velocity in the same direction as the expected flow of hot fluid therepast. However, in some cases, such as when one or both surfaces of the wall means have a small radius of curvature (e.g. the leading edge of a gas turbine rotor blade or stator) it may not be geometrically possible to obtain orientations of cooling holes which discharge coolant in the direction of hot gas flow.

In particular, the film cooled component may comprise an air-cooled turbine blade or vane for a gas turbine engine.

Film cooling holes with frusto-conical or fan-shaped convergent and divergent portions may be drilled by directing a laser beam onto one of said first and second surfaces to remove material therefrom, angularly oscillating the laser beam about a chosen point of null beam movement of the beam within the wall means, and continuing to drill until both the outlet and inlet portions of the film cooling hole have been produced, the metering restriction thereby being produced around said chosen null point.

To produce frusto-conical convergent and divergent portions the envelope of oscillation of the beam should be a conical surface whose apex is the chosen null point. However, to produce fan-shaped convergent and divergent portions the envelope of oscillation is a fan shape whose apex is the null point.

By substituting a rod-shaped electrode for the laser beam and appropriately controlling its movement, frusto-conical or fan-shaped convergent and divergent portions may alternatively be similarly drilled by electro-discharge machining apparatus.

To produce a "composite" film cooling hole by means of drilling a group of smaller holes using laser or electro-discharge or electro-chemical drilling techniques, the member-holes of the group are drilled successively with mutually crossing orientation such that they penetrate the first and second surfaces in overlapping fashion and define at their mutual crossing the metering restriction.

BRIEF DESCRIPTION OF THE PREFERRED EMBODIMENTS

Exemplary embodiments of the invention will now be described with reference to the accompanying drawings, in which.

DETAILED DESCRIPTION OF THE PREFERRED EMBODIMENTS

Figure 1:
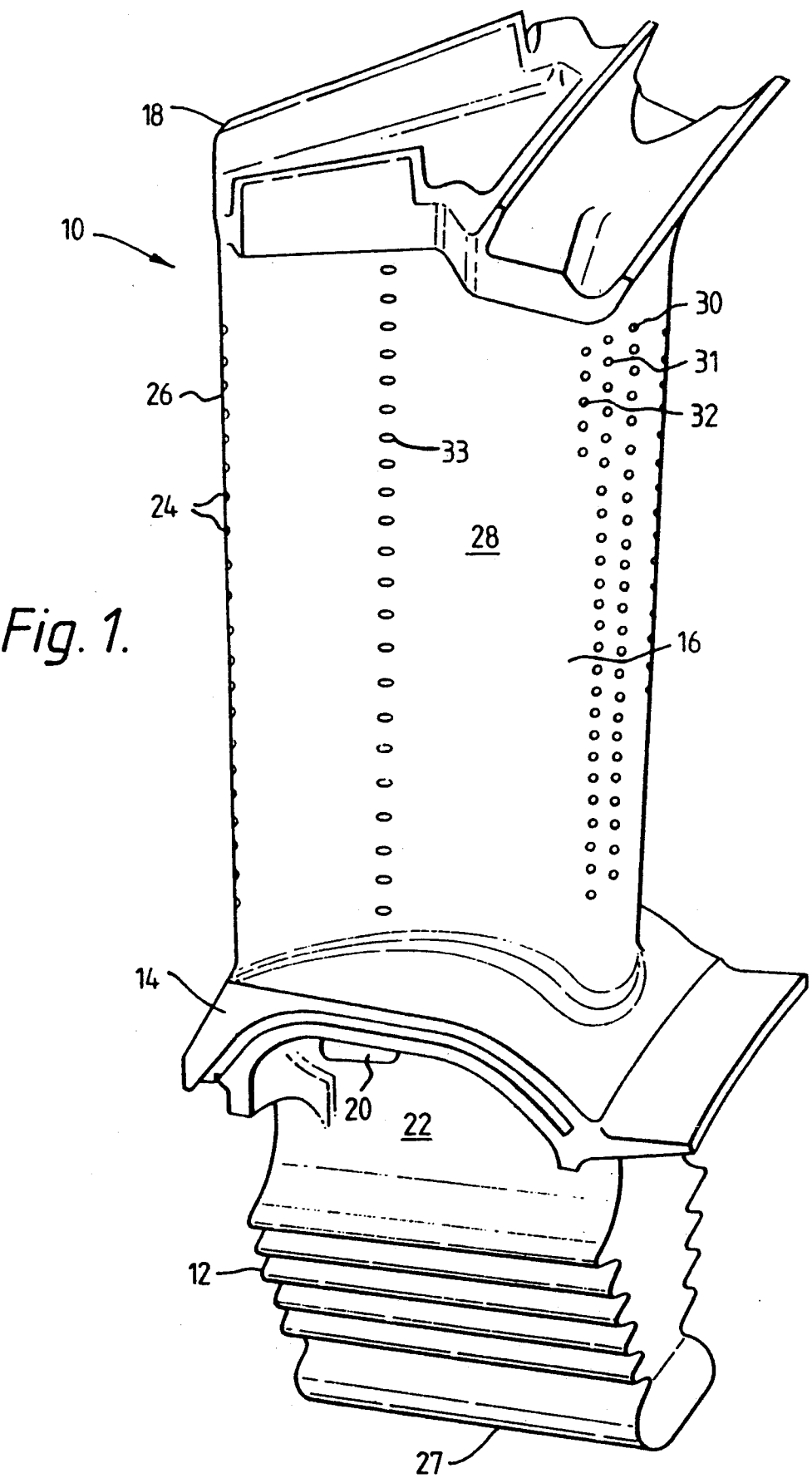
FIG. 1 is a perspective view of a known high pressure turbine rotor blade provided with film cooling holes.

Referring first to the complete turbine blade 10 shown in FIG. 1, it comprises a root portion 12, having a so-called "fir-tree" sectional shape which locates in a correspondingly shaped slot in the periphery of a turbine rotor disc (not shown); a radially inner platform 14, which abuts the platforms of neighbouring blades to help define a gas passage inner wall for the turbine; an aerofoil 16, which extracts power from the gas flow past it; and an outer shroud portion 18 which again cooperates with its neighbours to help define the outer wall of the turbine's gas passage. Although described here in relation to integrally shrouded blades, the invention is of course equally applicable to unshrouded blades, or indeed other film-cooled components.

The interior of the aerofoil 16 contains a chordwise succession of substantially mutually parallel cooling air passages (not shown, but see, e.g., our copending British patent application number 8828541 for exemplary details) which passages extend spanwise of the aerofoil. One or more of the passages are connected to a cooling air entry port 20 provided in the side face of an upper root shank portion 22 just below the underside of inner platform 14. This receives low pressure cooling air, which cools the aerofoil 16 by taking heat from the internal surface of the aerofoil as it flows through the internal passage and out through holes (not shown) in the shroud 18 and also through the spanwise row of closely spaced small holes 24 in the trailing edge 26 of the aerofoil.

Others of the internal passages are connected to another cooling air entry port (not shown) located at the base 27 of the "fir-tree" root portion 12, where high pressure cooling air enters and cools the internal surfaces of the aerofoil 16 by its circulation through the passages and eventual exit through holes (not shown) in the shroud 18. It is also utilized to film-cool the external surface of the flank 28 of the aerofoil 16 by means of spanwise extending rows of film cooling holes 30 to 33.

Figure 2A:
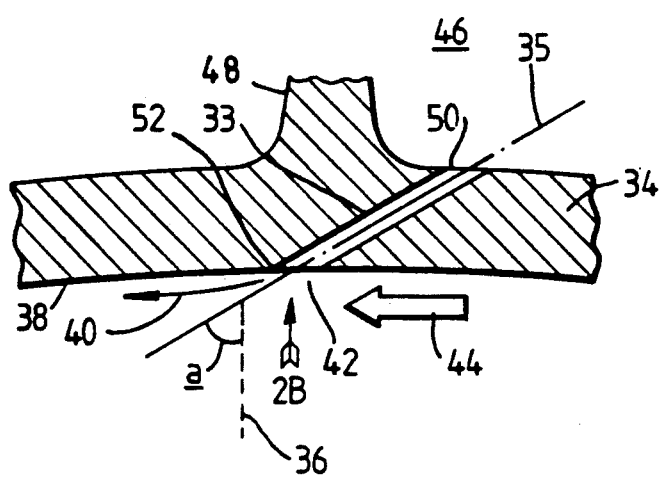
FIG. 2A is a longitudinal cross-section through a prior art film cooling hole.
Figure 2B:
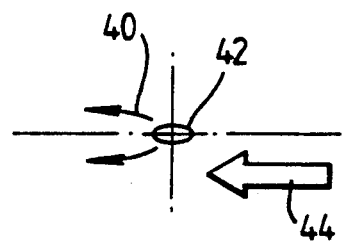
FIG. 2B is a plan view on arrow 2B in FIG. 2A showing the shape of the prior art film cooling hole's exit aperture.

FIG. 2 shows a typical cross-section through the wall 34 of the blade 10 in the region of the row of film cooling holes 33, one of the holes 33 being seen in longitudinal cross-section. The hole 33 penetrates the wall thickness obliquely at an angle a of the hole's longitudinal center line 35 with respect to a normal 36 to the exterior surface 38 of the aerofoil in that region. This measure ensures a less turbulent exit of the stream of cooling air 40 from the hole's exit aperture 42 onto the surface 38, because the stream of cooling air is thereby given a component of velocity in the direction of the flow of hot turbine gases 44 over the surface 38. The film cooling air 40 is as previously mentioned taken from one of the internal passages 46, shown partially bounded by the wall 34 and an internal partition 48. The shape of the exit aperture 42 is of course elliptical.

When gas turbine engines are operated in certain arid areas of the world, primarily the Middle East, very fine dust particles, prevalent in the first few tens of meters above ground level and on occasion present at altitudes of thousands of meters, can enter the engine's cooling air system by way of the engine's compressor and pass into the interior of the turbine blades or other cooled blades or vanes. When cooling air flowing along the surface of an internal cooling passage or chamber such as 46 encounters the entry aperture 50 of a hole 33, some of the cooling air flows into the hole and the edges of the entry aperture 50 generate vortices in the flow. It is believed that fine particles are separated from the main flows of air through the passage 46 or through the hole 33 and are deposited in the low velocity regions near the edges, where some of the minerals in the dust particles are heated to temperatures near or at their melting points, rendering at least some of the particles tacky or plastically deformable and liable to stick to each other and to the metallic surface. At these points the deposits grow, and the entry aperture 50 slowly becomes blocked.

Regarding blockage of the exit aperture 42, the deposits tend to build up on the downstream edge 52 of the hole. Build-up here is more likely to be due to the passing particles in the main turbine gas flow 44 experiencing the edge 52 as a step in spite of the angling of the hole 33 at angle a, the flow therefore becoming detached from the surface at this point and forming a vortex. This is more likely to be the case when the cooling hole is not blowing hard, i.e. when the pressure drop between passage 46 and the external surface 38 of the blade is small. However, for higher pressure drops and consequently greater blowing rates, the hot gas flow 44 meeting cooling air stream 40 will produce a local vortex and this will deposit particles in a similar manner. Either way the deposits grow towards the opposite edge of the exit aperture 42 and eventually block the hole.

Figure 3A:
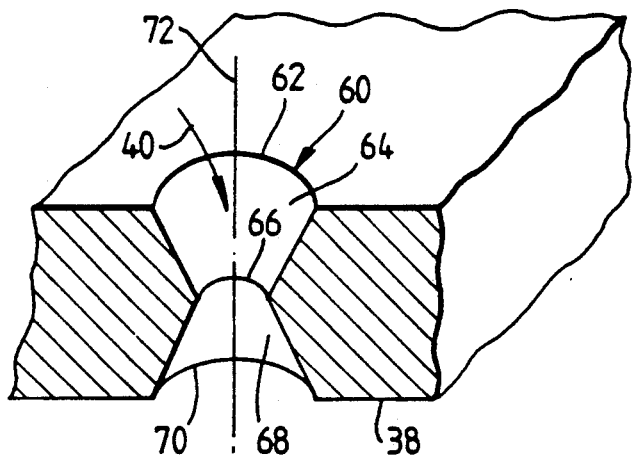
FIG. 3A is a perspective view of a cross-section through a film cooling hole configuration in accordance with the invention.
Figure 3B:
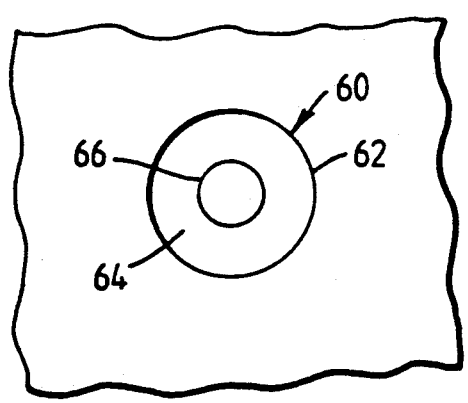
FIG. 3B is a plan view showing the shape of the film hole's entry aperture.

It is often the internal blockage that is most troublesome to the operator of the engine because it can build up more quickly and also is not easily accessible to abrasive cleaners and the like. FIGS. 3A and 3B illustrate how this problem can be significantly eased according to the invention by drilling a hole 60 which has an entry aperture 62 leading into a convergent frusto-conical portion 64, a throat 66 and a divergent frusto conical portion 68 leading to an exit aperture 70. The throat 66 connects the narrowest parts of the convergent and divergent portions 64,68 and defines a flow constriction. This is necessary for restricting or controlling the flow rate of film cooling air through the hole 60 according to the difference in pressure between the cooling air chamber or passage within the aerofoil and the exterior surface 38. The longitudinal axis 72 of the hole is in this case normal to the surface 38.

The flaring of film cooling holes at entry as well as exit has the following advantages, namely: the length of hole which is at the minimum (air metering) diameter is short, so reducing the likelihood of blockage; the increased hole area and blunter edges of the inlet and outlet apertures leads to reduced vorticity and velocity of air flow past the edges, so that less particles are deposited from the airstream; and the larger apertures take longer to block up.

It is important that the air flowing through the film cooling hole 60 does not experience the minimum diameter 66 as a severe vortex-producing step which would tend to cause excessive deposition of particles from the air flow onto the walls of the hole. For this reason it is necessary to ensure that the machining process used to produce the hole is able to attain and maintain good alignment between the two frusto-conical portions 64,68, i.e. they should have a straight longitudinal axis 72 common to both portions.

Figure 4B:
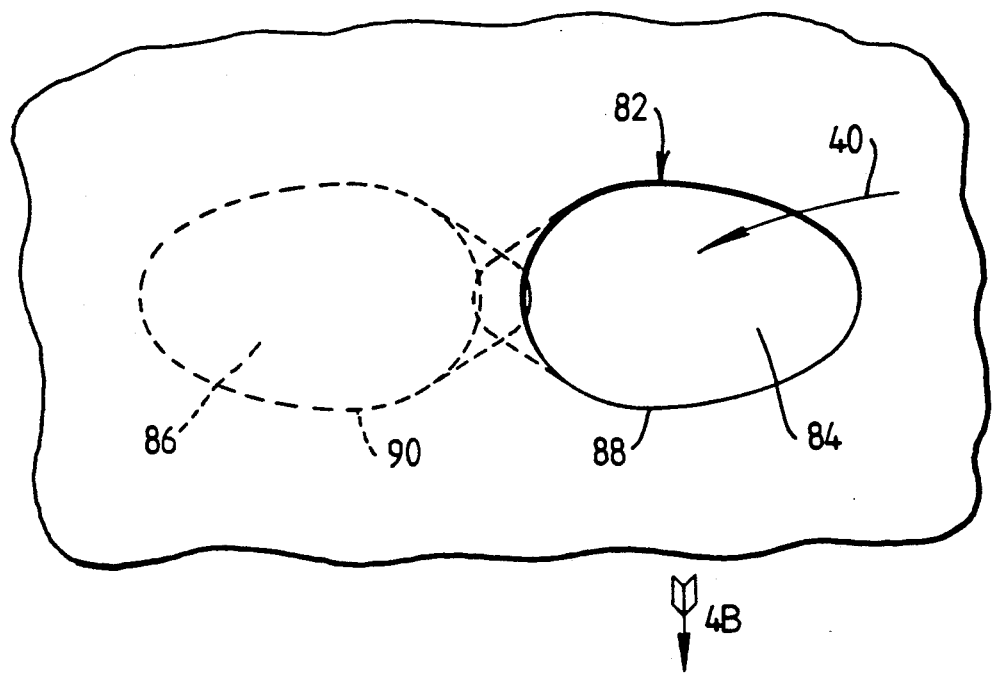
FIG. 4B is a plan view on arrow 4B in FIG. 4A showing the shapes of the entry and exit apertures of the film cooling hole.
Figure 4A:
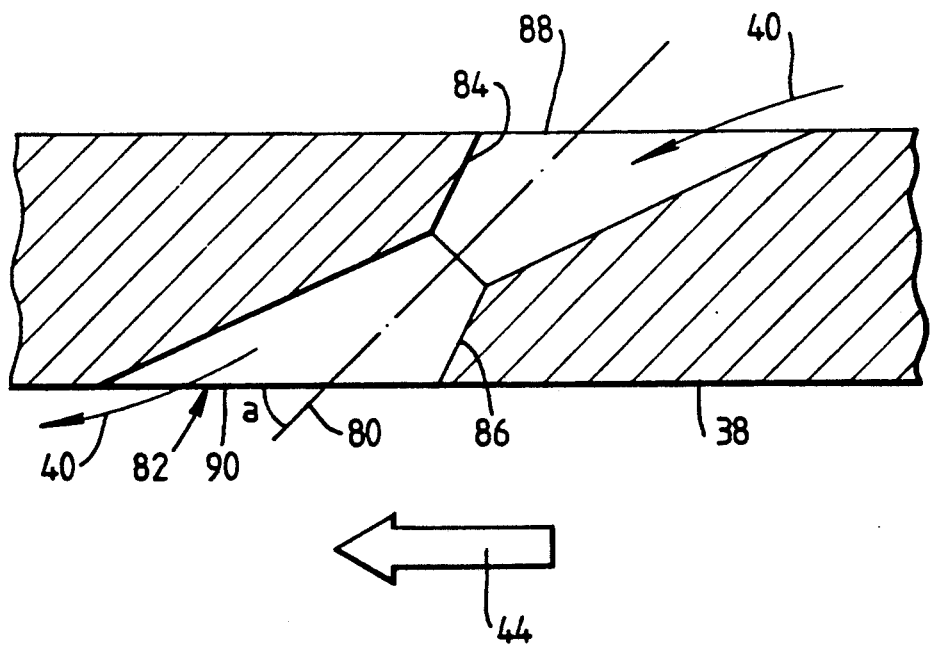
FIG. 4A is a cross-sectional side elevation through a film cooling hole according to the invention but having an oblique orientation with respect to the film cooled surface.

As already pointed out in relation to FIG. 2, it can often be advantageous to orient the film cooling hole obliquely with respect to the external surface of the blade so that the cooling air 40 issues from the hole with a velocity component in the same direction as the flow of the hot gases 44 past the hole. FIG. 4 shows a variation of the invention in which this is achieved by inclining the longitudinal axis 80 of the hole 82 at an angle a to the external surface 38 of the blade. The entry and exit portions 84,86 respectively of the hole 82 are still frusto-conical, but the entry and exit apertures 88,90 are no longer circular, now being egg-shaped as shown in FIG. 4B.

In FIG. 4, the entry and exit apertures of the film cooling hole are elongate in the direction of flow 44 over the external surface. However, it can be advantageous to have a configuration like that shown in FIG. 5, in which the film cooling hole 100, having entry and exit apertures 102,104 respectively and a throat 106, has its entry and exit portions elongated transversely of the expected direction of hot gas flow 44. After passing through convergent portion 107 and throat 106, the coolant flow 40 diffuses through the divergent portion 108 of the hole to the oval (race-track shaped) exit aperture 104 and forms a broader stream on blade surface 38 than would a similar flow emerging from a circular exit aperture of the same area.

Figure 5B:
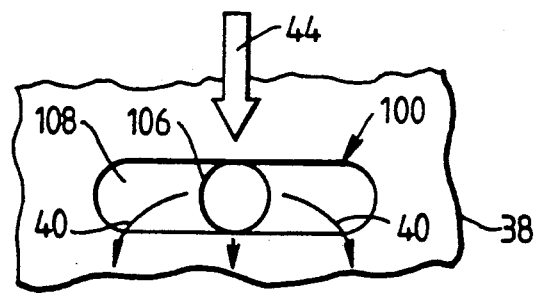
FIGS. 5B and 6B are views on arrows 5B and 6B respectively of the holes shown in FIGS. 5A and 6A.
Figure 5A:
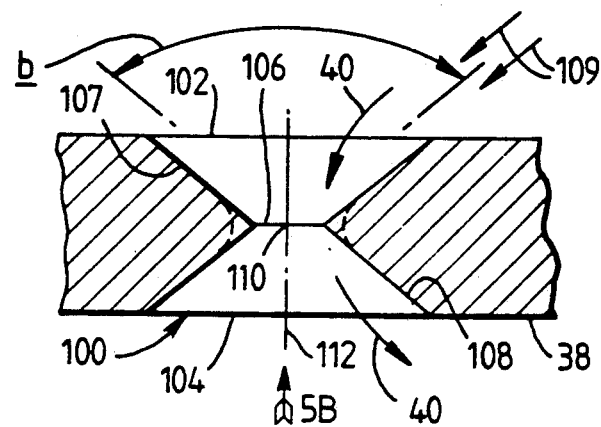
FIGS. 5A and 6A are cross-sectional side elevations through alternative forms of film cooling hole according to the invention.

Although FIG. 5 shows a film cooling hole with its longitudinal center line extending normal to the external surface 38, it is plainly possible for the hole to be formed with an oblique orientation, e.g. for the purpose of giving cooling air 40 a larger component of velocity in the direction of hot gas flow 44.

With regard to manufacturing processes suitable for producing film cooling holes, several methods are already available for producing holes like that shown in FIG. 2.

Electro-discharge or spark-erosion machining (EDM) uses rod-like wire electrodes to drill through the workpiece using a low-voltage, high current power source connected across workpiece and electrode. Holes upwards of about 0.22 mm diameter can be produced. It is a slow process, but it is possible to drill several holes simultaneously, provided they are mutually parallel.

Capillary drilling is an alternative chemical machining process described in British Patent Number 1348480 and assigned to Rolls-Royce. An inert (non-consumable) electrode in the form of a fine wire is surrounded by a concentric glass capillary tube. An electrolyte is passed down the annular gap between electrode and tube and material is removed from the workpiece when a voltage is applied across the electrode and the workpiece. Its capabilities are similar to EDM.

In laser machining, a pulsed beam of high energy laser light is focused onto the workpiece surface, causing the material at the focus to absorb energy until vaporized and removed from the workpiece. Through holes can be drilled by constantly adjusting the focus of the beam as material is removed to keep the hole the same diameter and maintain power density at the point of impingement on the work. Alternatively, a very thin highly coherent beam can be utilized without focusing. Holes with diameters upwards of about 0.25 mm can be drilled in this way either by keeping a focussed beam stationary, or by trepanning with a thin highly coherent beam. In the latter process, the laser beam is passed through an optical system which makes the beam move round the periphery of a cylinder of small diameter related to the size of hole it is desired to drill. In this way the laser beam cuts out the hole around its edge. Surface finish of the hole is better by the latter method.

Insofar as drilling film cooling holes in turbine blades or vanes is concerned, lasers are several times faster per hole produced than the other two processes mentioned above.

For a laser drilling process capable of producing all the film cooling holes of FIGS. 3 to 5, reference should be made to our copending patent application GB8823874.6, in which shaped holes are produced by laser drilling techniques which utilise an optical system comprising lenses and mirrors to move a laser beam relative to the external surface of a component through paths appropriate to drill out the required shape. The disclosure of GB8823874.6 is hereby incorporated by reference.

In brief, a laser drilling technique appropriate to produce a hole like that of FIG. 3 involves using a lens to direct a high-power highly coherent pulsed laser beam onto the surface 38 to be drilled. Before it passes through the lens, the laser beam is reflected from a laterally movable mirror in an optical head positioned above the lens, the mirror being laterally offset from the lens' optical axis by a variable amount, the lens' optical axis defining the longitudinal axis 72 of the hole to be drilled. The optical head is rotatable; thus the mirror is caused to orbit about the optical axis of the lens, so that where the laser beam meets the surface 38 it begins to describe the curved surface of the divergent conical portion 68 whose apex is the point of null movement of the beam within the thickness of the material being drilled. This may be likened to trepanning. The laser beam impinges on the surface at an acute angle determined by the amount of lateral offset of the mirror from the lens' optical axis. The cone angle of the conical portion 68 is of course given by 180° less twice this acute angle of impingement. By appropriately adjusting the relevant machining parameters such as the energy of the laser beam and continuing to drill after conical portion 68 has been produced, the complementary conical portion 64 is also produced, the intersection of the two conical portions forming the throat 66.

A hole like that of FIG. 4 can be produced in the same way, except that the optical axis of the laser drill must be oriented to coincide with the desired orientation of longitudinal axis 80 with respect to the component's exterior surface 38.

The "2-dimensional cone" or "fan" shapes of FIG. 5 can be produced by an arrangement in which the optical head is kept stationary (i.e. non-rotating) and the lateral offset of the mirror is varied by oscillating it over a range of movement either side of the lens' optical axis. In this case the laser beam 109 does not perform a trepanning motion but is seen to oscillate through an angle b about the null point 110 where the hole's axis 112 passes through the throat 106.

As an alternative to the use of a sophisticated laser drill, it may be possible to utilized electro-discharge machining to produce the hole shapes shown in FIGS. 3 to 5, by simultaneously oscillating and advancing a cylindrical electrode, the electrode in effect substituting for the laser beam. However, this would be much slower than laser drilling.

Figure 6B:
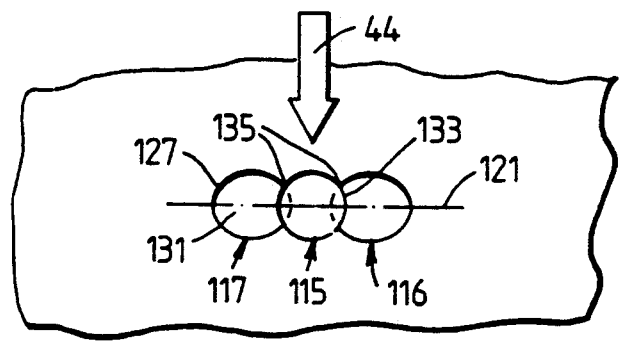

As a further, lower-cost alternative to the production of the hole shown in FIG. 5, it may be approximated as shown in FIG. 6, in which three separate cylindrical holes 115-117, having respective longitudinal center lines 118-120 sharing a common plane 121, are drilled at somewhat differing but mutually crossing orientations so that their center lines intersect each other at a point 123 within the component wall thickness 34, and so that they are still overlapping each other to some extent where they penetrate the exterior and interior surfaces 38,123 respectively. This produces a composite film cooling hole comprising elongated entry and exit apertures 125,127, convergent and divergent entry and exit portions 129,131 and a cooling metering restriction or throat 133, all of which features comprise the three dimensional envelope of the crossing, overlapping holes. The overlapping of the three holes may produce cusp-shaped portions 135 in the entry and exit apertures 125-127 and the convergent and divergent portions 129,131, but the cusps 135 may be minimized by either drilling more overlapping holes in each group of holes comprising each composite hole, or by drilling non-circular cross-section holes.

Figure 6A:
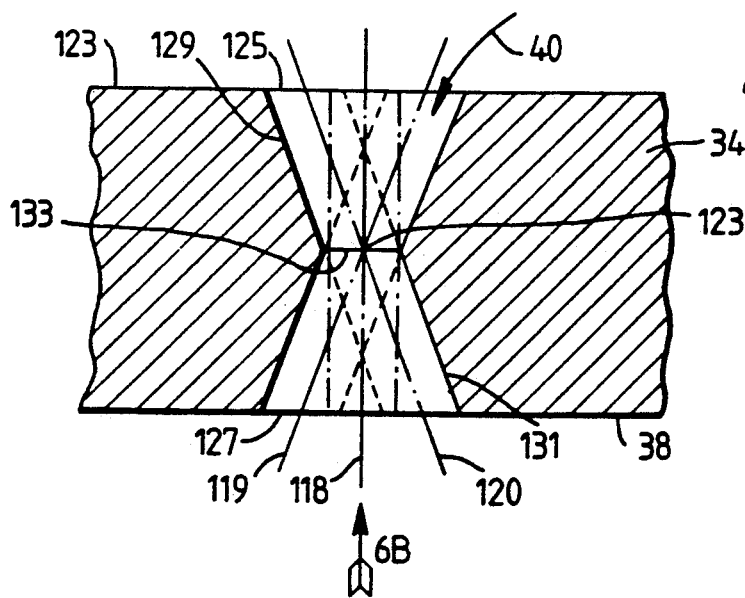

Whereas in FIG. 6, the holes 115-117 are shown as having substantially the same diameters, it may be desirable to drill holes of differing diameters. For example, if the central hole 115 were to be made of larger diameter than the other two, there would be produced a throat, connecting the narrowest parts of the convergent and divergent portions, which would comprise a cylindrical portion whose length would be controlled by the difference in diameter between hole 115 and the other two. One advantage of such a throat would be elimination of the single relatively sharp edge of throat 133 shown in FIG. 6A. Another advantage would be the production of a throat whose diameter can be more precisely controlled during the production process, because one disadvantage with the hole configuration shown in FIG. 6 is that the attainment of a precise predetermined diameter of throat 133 is dependent on precise orientation of the three holes' center lines 118-120 with respect to each other.

To produce the composite film cooling hole shown in FIG. 6, the individual holes 115-117 may be drilled using either EDM or laser techniques, or even capillary drilling. In neither case is oscillation of the electrode or the laser beam necessary. Hole 115 may be drilled first, shown in chain dotted lines (FIG. 6A), then the other two holes 116 and 117 with equal but opposing obliquities with respect to the external surface 38, the missing portions of the holes 116 and 117 where they overlap being shown as dashed lines.

Orientation of the long dimension of the exit aperture 127 with respect to the direction of the main hot gas flow 44 over the external surface 38 is again transverse.

Plainly, besides the one shown in FIG. 5, various other composite film cooling hole configurations, involving two, three, or more overlapping holes which cross each other within the wall thickness to form an air metering restriction, are possible. The holes may be drilled at any inclinations of choice with respect to the external wall surface of the component and the cooling metering restriction may be formed at any desired position behind the surface, according to the shapes of entry and exit apertures required. It is not necessary for the center lines of the holes to intersect each other exactly, or to intersect at exactly the same point, provided a suitable air flow throttling restriction for the composite hole is formed.

It is not necessary for the overlapping holes to be of circular cross-section. For example, oval holes could be utilized, obtained by using oval cross-section electrodes for EDM, or an appropriately controlled trepanning laser beam.

Although FIG. 6 shows the longitudinal center lines 118-120 of the drilled holes occupying a common plane 121 perpendicular to the external wall surface 38, the plane 121 could if desired be given an oblique orientation so that on flowing through the composite hole, coolant 40 is given a component of velocity in the direction of main flow 44. Furthermore, provided only that the longitudinal center lines 118-120 of holes 115-117 intersect or approximately intersect at a common point and that the holes overlap throughout their lengths, there is no need for their center lines to be in a common plane. Instead, they could have skew angles with respect to each other so that it would be possible for the long dimensions of the entry and exit apertures to be oriented differently from each other, e.g. the inlet aperture could be oriented transversely of the cooling flow internally of the component and the outlet aperture oriented transversely of the main hot gas flow over the component's external surface.

As already explained in connection with FIG. 4, it is important from the point of view of minimizing deposition of debris from the cooling air onto the walls of the film cooling holes that the throttling restrictions or throats in the various film cooling holes of FIGS. 3 to 6 do not excite excessive vorticity in the flow of coolant through them. For instance, in FIG. 5, the machining process theoretically produces a throat with a sharp angular profile. However, in practice the throat edge 110 would be a radius, and if desired this radius could be made larger, as shown by the dashed lines by means of a finishing operation using a slightly defocussed laser beam. Alternatively, a laser beam could be trepanned around a slightly larger diameter to produce a throat comprising a short cylindrical passage rather than an edge. These techniques would also be applicable to the other embodiments.

Although the above specific embodiments have concentrated on the production of various film cooling hole configurations in the aerofoil portions of stator vanes or rotor blades, such configurations can also be utilized to cool the shrouds or platforms of these devices, or indeed for other surfaces in the engine requiring film cooling.

Whilst specific reference has been made to air-cooled turbomachinery components, other fluids may also be utilized to film-cool surfaces exposed to intense heat, and the ambit of the invention does not exclude them.

We claim:

1. A film-cooled component subject to heating by hot fluid flowing therepast, the component having wall means with one side thereof being a first surface subject to said heating and the other side thereof being a second surface subject to cooling by blow of pressurized coolant therepast, the wall means having a plurality of film cooling holes therethrough connecting the first and second surfaces to allow coolant to flow through said holes onto the first surface for film-cooling of the same, wherein the holes comprise in coolant flow series an inlet aperture on the second surface, a convergent portion, a coolant flow metering restriction, a divergent portion and an outlet aperture on the first surface, the metering restriction connecting the narrowest parts of the convergent and divergent portions, wherein the inlet and outlet apertures, the convergent and divergent portions and the metering restriction comprise the three-dimensional envelope of a group of mutually crossing holes which penetrate the first and second surfaces in overlapping fashion to form at least one cusp-shaped edge at a location where at least two holes overlap, the metering restriction being defined at the mutual crossing of the holes of the group.

2. A component according to claim 1 in which the metering restriction comprises a short passage.

3. A component according to claim 1 in which the convergent and divergent portions are fan-shaped.

4. A component according to claim 1 in which the outlet apertures are elongate in a direction transverse of the expected flow of hot fluid therepast.

5. A component according to claim 1 in which the inlet apertures are elongate in a direction transverse of the expected flow of coolant therepast.

6. A method of drilling film cooling holes in a film-cooled component, said component being subject to heating by hot fluid flowing therepast, the component having wall means with one side thereof being a first surface subject to said heating and the other side thereof being a second surface to cooling by flow of pressurized coolant therepast, comprising the step of drilling a group of holes through the wall means to connect the first and second surfaces, the individual holes of the group being drilled successively with mutually crossing orientation such that they penetrate the first and second surfaces in overlapping fashion to form at least one cusp-shaped edge at a location where at least two holes overlap, a metering restriction being defined at the mutual crossing of the holes of the group.

7. A method according to claim 6 in which the holes are drilled by means of a laser drilling apparatus.

8. A method according to claim 6 in which the holes are drilled by means of an electro-discharge machining apparatus.

9. A method according to claim 6 in which the holes are drilled by means of an electro-chemical machining apparatus.

* * * * *